US011513283B2

(12) United States Patent
Guillemette et al.

(10) Patent No.: US 11,513,283 B2
(45) Date of Patent: Nov. 29, 2022

(54) MICROLAYER COEXTRUSION OF OPTICAL END PRODUCTS

(71) Applicant: Guill Tool & Engineering Co., Inc., West Warwick, RI (US)

(72) Inventors: Richard Guillemette, West Warwick, RI (US); Robert Peters, West Warwick, RI (US); Christopher Hummel, Providence, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 179 days.

(21) Appl. No.: 17/119,274

(22) Filed: Dec. 11, 2020

(65) Prior Publication Data
US 2021/0096296 A1 Apr. 1, 2021

Related U.S. Application Data

(63) Continuation of application No. 16/692,225, filed on Nov. 22, 2019, now Pat. No. 10,866,358, which is a (Continued)

(51) Int. Cl.
*G02B 6/02* (2006.01)
*G02B 6/036* (2006.01)
*G02B 6/032* (2006.01)
*B29C 48/16* (2019.01)
*G02B 6/122* (2006.01)
*G02B 1/04* (2006.01)
*H01G 9/20* (2006.01)
*B29D 11/00* (2006.01)

(52) U.S. Cl.
CPC ......... *G02B 6/02295* (2013.01); *B29C 48/16* (2019.02); *G02B 1/045* (2013.01); *G02B 6/023* (2013.01); *G02B 6/0208* (2013.01); *G02B 6/02304* (2013.01); *G02B 6/032* (2013.01); *G02B 6/03616* (2013.01); *G02B 6/03688* (2013.01); *G02B 6/1221* (2013.01); *H01G 9/2068* (2013.01); *B29D 11/00663* (2013.01); *G02B 6/02076* (2013.01); *G02B 6/02123* (2013.01); *G02B 6/02352* (2013.01)

(58) Field of Classification Search
CPC ............ G02B 6/02034; G02B 6/02076; G02B 6/0208; G02B 6/023; G02B 6/02304; G02B 6/02123; G02B 6/02295; G02B 6/02314; G02B 6/02342; G02B 6/02352; G02B 6/032; G02B 6/03605; G02B 6/03616; G02B 6/03688; G02B 6/122; G02B 6/1221; G02B 1/045; H01G 9/2068; H01G 9/2095; B29C 48/16
See application file for complete search history.

(56) References Cited

U.S. PATENT DOCUMENTS

| | | | | |
|---|---|---|---|---|
| 2005/0040374 A1* | 2/2005 | Chittibabu | ........... | H01G 9/2095 257/E31.038 |
| 2006/0185714 A1* | 8/2006 | Nam | .................... | H01G 9/2031 136/251 |
| 2013/0284594 A1* | 10/2013 | Bluck | ................. | H01J 37/3497 204/298.07 |

* cited by examiner

*Primary Examiner* — Michael P Mooney
(74) *Attorney, Agent, or Firm* — Ziegler IP Law Group, LLC

(57) ABSTRACT

The disclosed embodiments generally relate to extruding multiple layers of micro- to nano-polymer layers in a tubular shape. In particular, the aspects of the disclosed embodiments are directed to a method for producing a Bragg reflector comprising co-extrusion of micro- to nano-polymer layers in a tubular shape.

14 Claims, 7 Drawing Sheets

Related U.S. Application Data continuation of application No. 16/020,014, filed on Jun. 27, 2018, now Pat. No. 10,488,583, which is a continuation of application No. 15/477,252, filed on Apr. 3, 2017, now Pat. No. 10,029,431, which is a continuation of application No. 13/972,753, filed on Aug. 21, 2013, now Pat. No. 9,643,368.

(60) Provisional application No. 61/691,771, filed on Aug. 21, 2012.

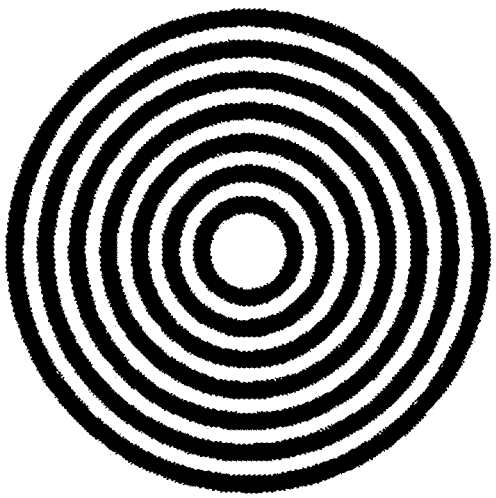
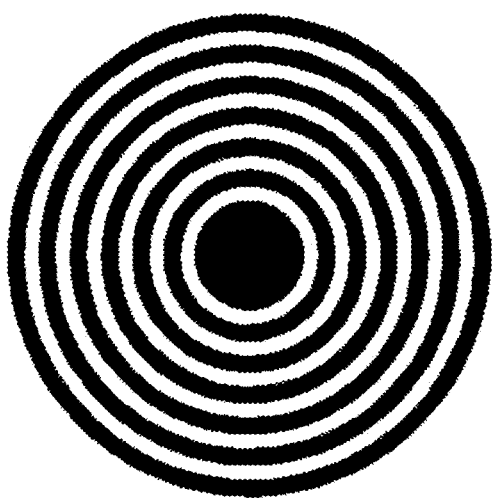
Figure 3a                                     Figure 3b
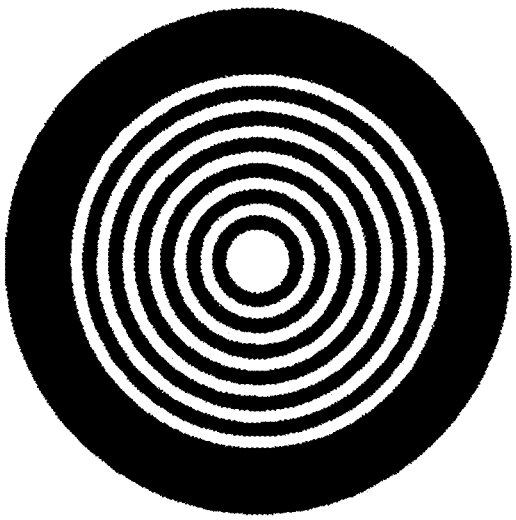
Figure 4

Constant

Chirped

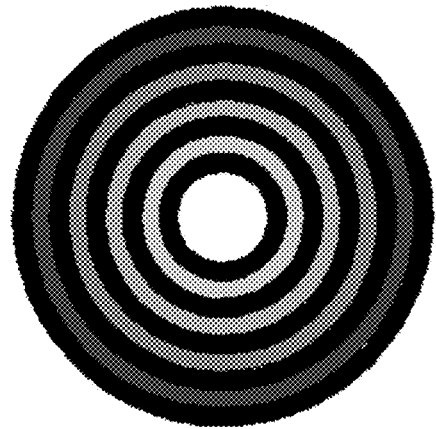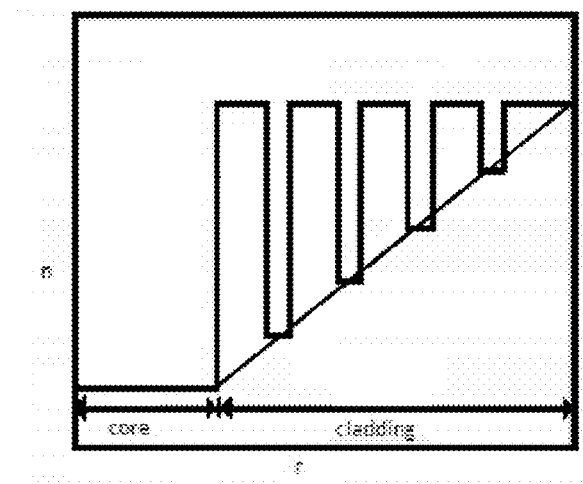
Figure 7
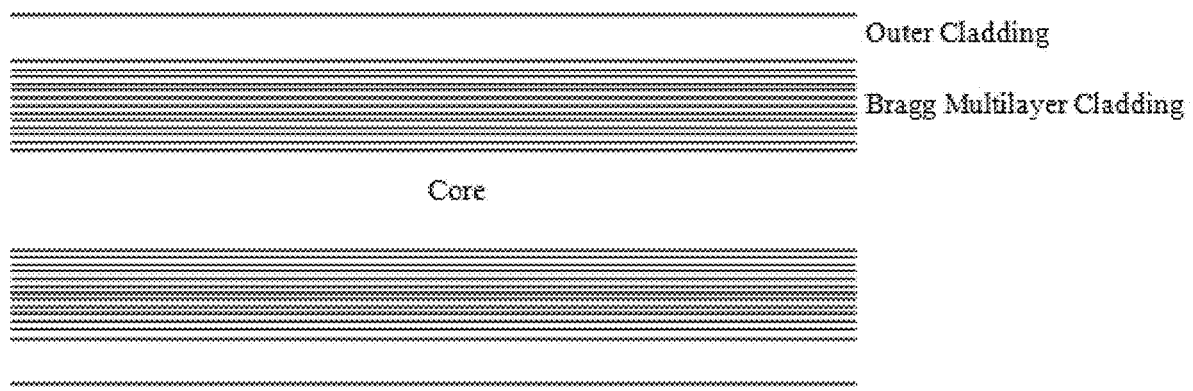
Figure 8

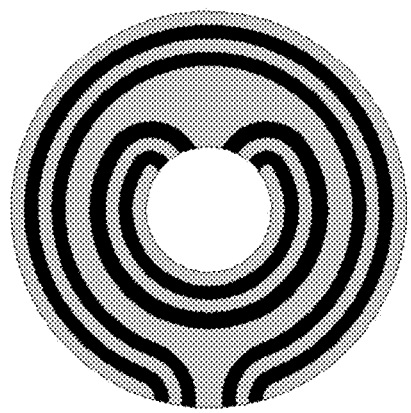
Figure 12
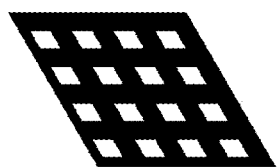 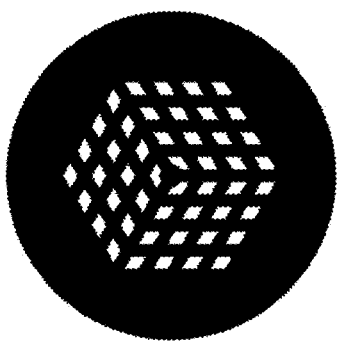
Figure 13(a)   Figure 13(b)

MICROLAYER COEXTRUSION OF OPTICAL END PRODUCTS

CROSS-REFERENCE TO RELATED APPLICATIONS

This application is a continuation of U.S. patent application Ser. No. 16/692,225 filed Nov. 22, 2019, which is a continuation of U.S. patent application Ser. No. 16/020,014 filed Jun. 27, 2018 which issued as U.S. Pat. No. 10,488,583, which is a continuation of, claims priority to and the benefit of U.S. patent application Ser. No. 15/477,252 filed on Apr. 3, 2017 which issued as U.S. Pat. No. 10,029,431, which application is a continuation of, claims priority to and the benefit of U.S. patent application Ser. No. 13/972,753 filed on Aug. 21, 2013, now U.S. Pat. No. 9,643,368, which claims priority to and the benefit of of U.S. Provisional Application No. 61/691,771 filed Aug. 21, 2012, the disclosures of which are incorporated herein by reference in their entireties.

FIELD

The disclosed embodiments generally relate to extruding multiple layers of micro- to nano-polymer layers in a tubular shape.

BACKGROUND

Multilayer coextrusion offers many unique design possibilities in the world of plastics. There are many established technologies for the creation of flat films with tens to thousands of layers. Such technologies generally utilize a feed-block which will either create the layers of polymer through layer by layer addition, create a layer pattern and then multiply it through a layer multiplication technique, or through some combination of the two. Some methods to create a tubular product from a stream of layers include, wrapping the stream annularly into a tube or tubular shape or by combining the stream along with other streams into the desired shape. One such micro-layer extrusion process method that provides products with small grain features is as described in U.S. Pat. No. 7,690,908, (hereinafter the "'908 patent"). Another example of a device that can be used in a microlayer extrusion process to create a laminated output with dimensions in the micro and nanometer range is United States Patent Publication 2012/0189789 (hereinafter the "789 Publication") published Jul. 26, 2012, entitled "Method and Apparatus for Forming High Strength Products," the disclosure of which is incorporated herein by reference in its entirety. This nano-flow die device (referred to herein as the "nano-flow die") can be used to create layers in a multilayered product that have at least one dimension in the nanometer range. Multilayered head extrusion die assemblers afford additional methods to make tubular products such as those described in United States Non-Provisional Application 61/639,034. In one such embodiment, the multi-layer extrusion die assembly includes a body, a main bore extending longitudinally through the assembly, a core tube, and a plurality of dies. The extrusion die assembly is configured to receive an input stream of material and divide the input stream into a plurality of material streams. Other methods of extrusion yield products possessing electrical properties such as described in U.S. Non-Provisional application Ser. No. 13/916,551, filed Jun. 12, 2013. More specifically, these extrusion products contain thin layer(s) (milli, micro or nano) wherein one or more layers contain electrical conducting materials and more specifically nanoparticle electrical conducting materials. Yet other methods of producing products with many layers include folding techniques of flows already in a tubular shape such as described in U.S. Provisional Application 61/728,213 filed Nov. 19, 2012.

Each of the above applications, Publications or patents is commonly owned by the assignee of the instant application, and the disclosures of which are incorporated herein by reference in their entirety.

SUMMARY

The present disclosure relates to the production of a Bragg reflector using multilayered co-extrusion of micro- to nano-polymer layers in a tubular shape. Such tubular shapes may be of variable length and construction. Certain tubular shapes may contain a core (which may be substantive or hollow). When the core is substantive it may comprise gases, liquids or solids. Suitable solids include polymeric materials or matter which is coextruded with the multilayer tube. Such polymeric materials may be transmissible to incident light. Suitable liquids include water, alcohols and organic liquids.

A Bragg reflector or Bragg fiber can be produced from multilayered co-extrusion technology. Alternating layers of polymeric material form a waveguide that allows the transmittance of electromagnetic waves. Waveguides are used in a variety of applications, specifically lasers, sensors, and optical fibers. A Bragg reflector can be used to amplify the total internal reflection of a solid optical fiber or be used in a hollow optical fiber to provide the internal reflection.

A Bragg reflector works on the principles of reflection, refraction, and constructive interference.

Alternating layers may be of constant, variable or Chirped gradient thickness. Layers ¼ the wavelength of incident light will constructively magnify the incident light. Materials with different refractive indices are layered to produce a Bragg reflector. Light reflects and refracts from each layer interface. By alternating materials of high and low refractive indexes in layers ¼ the wavelength of incident light, the reflected light will constructively interfere with the reflected light from previous layers, amplifying the reflection.

BRIEF DESCRIPTION OF THE DRAWINGS

FIGS. 3a and 3b illustrate different examples of cross-sectional geometries.

FIG. 4 illustrates an outer layer applied around the alternating layers.

FIG. 7 illustrates an exemplary product with annular layers with one layer having a graded refractive index.

FIG. 8 illustrates a waveguide with multilayer cladding around a core along with a separate outer cladding.

FIG. 12 illustrates transmitting light to of from a center of the cross-section.

FIG. 13(a) illustrates an example of a stream of material that could be formed by layering a stream containing alternating layers of black and white material with a stream of the black material.

FIG. 13(b) illustrates streams of alternating layers combined onto a small cord and combined with an outside coating.

DETAILED DESCRIPTION

Figure 1:
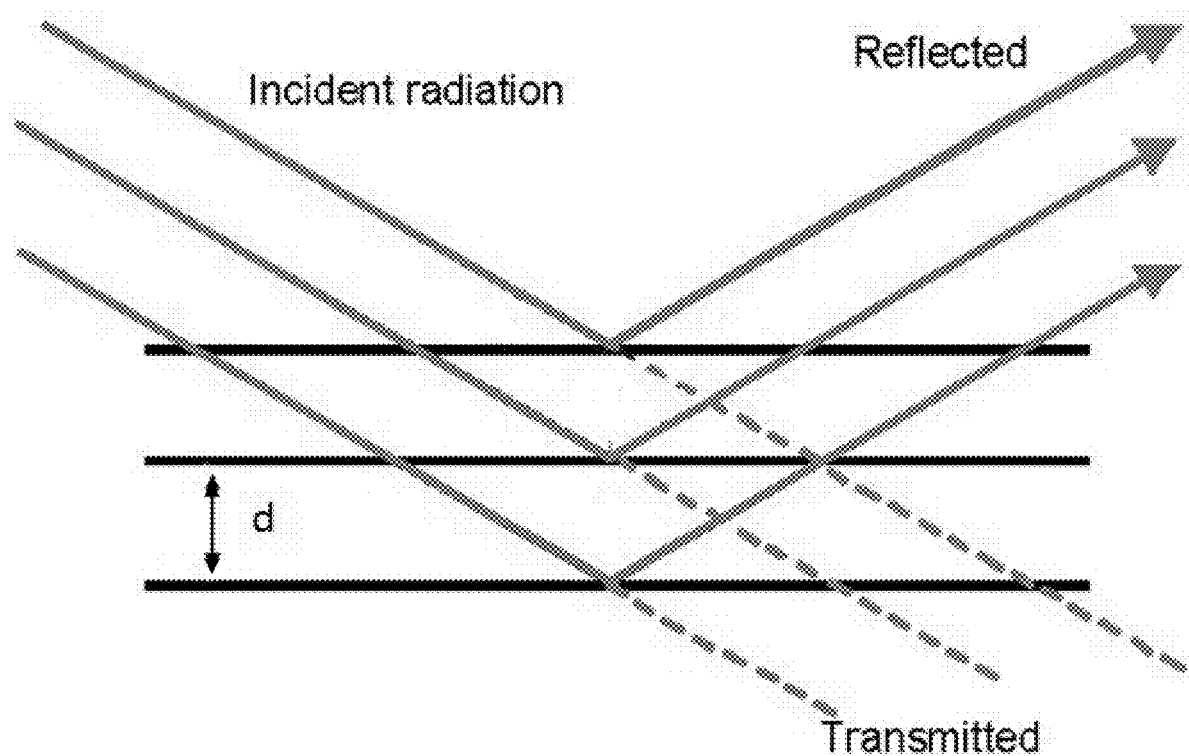
FIG. 1 is a graph illustrating the interference occurring at each layer of the Bragg reflector.

FIG. 1 depicts the interference that occurs at each layer of the Bragg reflector. The constructive interference occurs when the layer thickness (d) is ¼ the wavelength of the incident wave.

Alternating layers of polymeric materials with different refractive indices can be used as a Bragg reflector, suitable polymers include PMMA (poly(methyl methacrylate)), PS (polystyrene), polypropylene, polycarbonate, poly(2-chlorostyrene), poly(2,6-dichlorostyrene), poly(2,6-dichlorostyrene-co-glycidyl methacrylate), poly(1-naphthyl methacrylate), poly(pentabromobenzyl acrylate), poly(pentabromobenzyl methacrylate), poly(2,4,6-tribromophenyl methacrylate-co-glycidyl methacrylate), poly(vinyl phenyl sulfide), poly(N-vinylphthalimide), poly(2-vinylthiophene), and cyclic polyolefines including deuterated or fluorinated analogs, preferably polymethyl methacrylate and polystyrene.

Figure 2A:
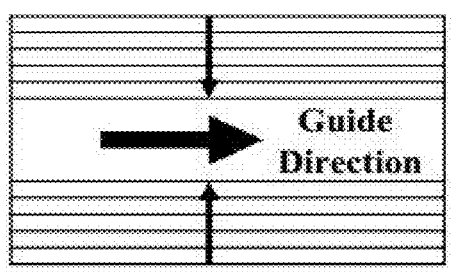
FIGS. 2a and 2b are illustrations of different thickness layers of polymeric materials.
Figure 2B:
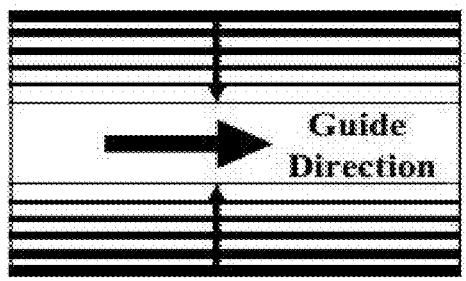

Increasing the refractive index difference of the layers and number of layers increases the reflectivity and widens the reflected bandwidth. Additionally, layers can be of constant thickness, such as depicted in FIG. 2a, variable thickness or a Chirped gradient such as depicted in FIG. 2b. Chirped gradients generally refers to a linear variation in the thickness of the grating layers and as such will increase the range of reflected wavelengths.

As seen in the cross sectional geometries of FIGS. 3a and 3b, these layers can be formed around a core (3b) or may be hollow (3a). The core may be comprised of any suitable material including objects (such as wires, rods, chains, fibers, etc.) in which the layers are extruded around the object or the core may comprise alternative polymeric materials.

An outer layer (or outer cladding, see also FIG. 8 below) can also be applied around the alternating layers, as illustrated in FIG. 4.

These geometries can be used to make waveguides, optical fibers and Bragg fibers. These in turn can be used in applications including lasers, fiber optics, lenses, solar fibers, circuits, switches, information transmission and sensors.

Figure 5A:
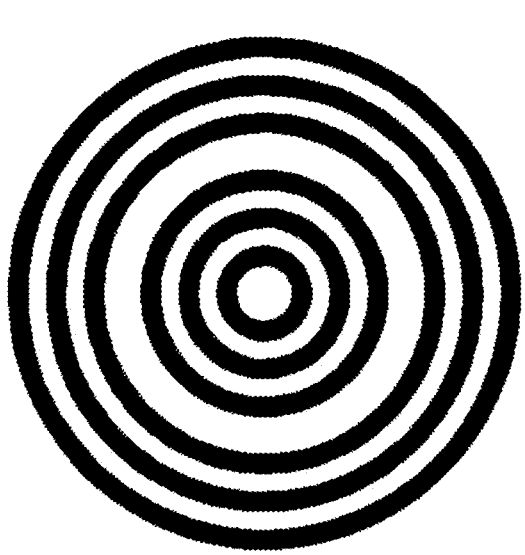
FIGS. 5a and 5b illustrate examples of chirped layers and constant layers.
Figure 5B:
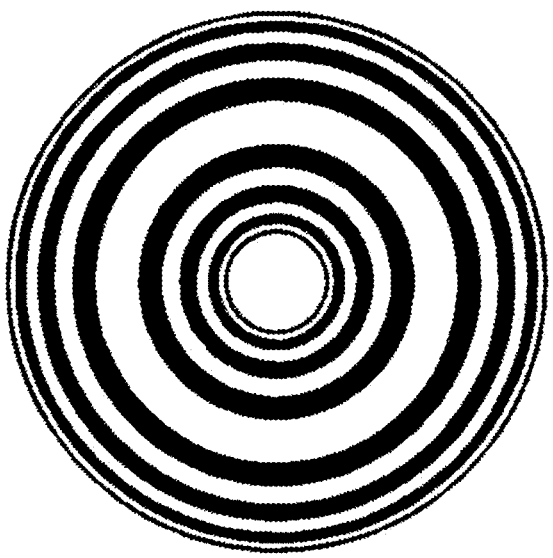

Two Bragg gratings can also be applied around an inner layer in order to transmit the wave inside this layer. This geometry is illustrated in FIG. 5, both with chirped layers (5a) and constant layers (5b). These geometries may be used to make annular Bragg resonators.

Figure 6:
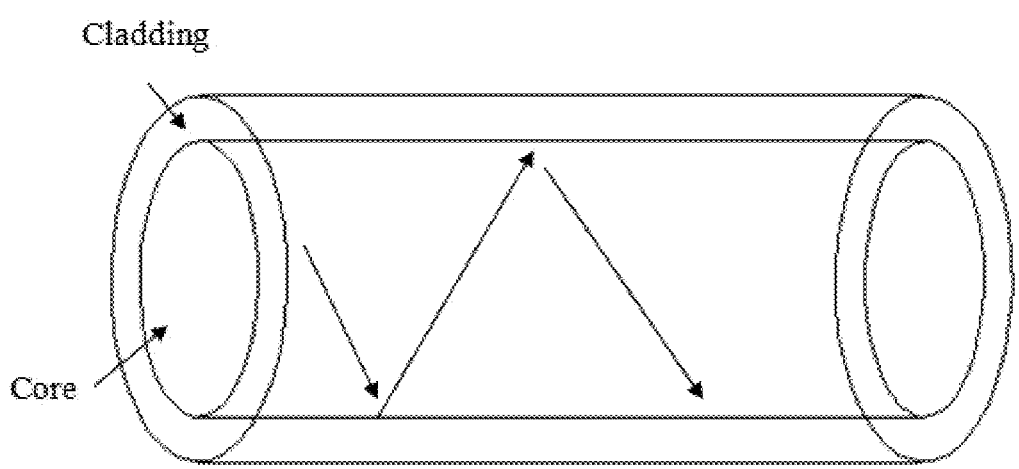
FIG. 6 illustrates a single interface between the cladding and the core.

In another embodiment of the present disclosure, multiple layer co-extrusion in a tubular shape may be used for the production of optical fibers. Optical Fibers are generally made with a cladding and a core. Many do not rely on Bragg reflection but rely on total internal reflection based on the single interface between the cladding and the core, as depicted in FIG. 6. However, an optical fiber can be made to use constructive interference from multilayered Bragg cladding in order to transmit the wave down the optical fiber.

FIG. 7 demonstrates a product with annular layers in which one of the alternating layering has a graded refractive index. In this example the gradient is present in every other layer but could be present in consecutive layers. The gradient need not be linear but could take other forms such as parabolic.

Changing the refractive index can also effect the dispersion performance of an optical fiber. Microlayers with a gradient refractive index can also be used to create lenses.

In another embodiment of the invention multi-layer coextrusion in a tubular shape may be used in the production of lasers. A laser utilizing the reflective properties of the multilayer Bragg grating would consist of a core bordered on each side by Bragg layers. A gain material, used in lasers to amplify light, would be added to the Bragg cladding or the core, resulting in a reflection greater than unity.

FIG. 8 refers to a waveguide with a multilayer cladding around a core along with a separate outer cladding.

The present invention also relates to tubes comprising an optical fiber coated with a photovoltaic material. Beyond annular layers, multiple streams of layered material(s) and non-layered-material(s) can be merged, folded and/or bent prior to extrusion in different orientations to create cross-sections which have unique properties and functions. The cross-sections of the resultant product could be any shape such as rectangular or elliptical and may or may not contain a core or be hollow. Some of such cross sections are depicted in FIGS. 9(a)-9(g).

Figure 9A:
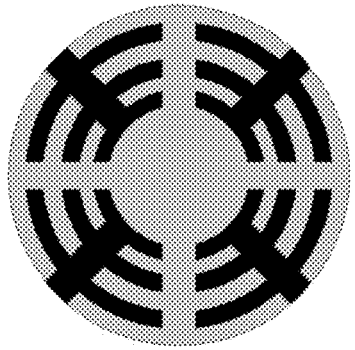
FIGS. 9(a)-9(g) illustrate cores of different cross-sections.

In another embodiment, the multi-stream approach may be used to create products which will have an increased surface area. As illustrated in FIG. 9(a), streams of alternating layers of materials can be separated by 'stems' comprised of a single material or mixture and applied onto a core. Each stem can be made of its own respective material or mixture allowing for the properties desired in that stem. A material or mixture may then be removed by some process, whether it is mechanical in nature such as peeling or chemical in nature such as dissolving. If one of the materials or mixtures used in the stem along with one or more of the materials used in the layers can all be removed, the result would be a core with stems protruding from the surface. These stems would have branches (layers) attached with a large surface area exposed to the environment. In the FIG. 9(a) there are alternating layers of grey and black material separated by alternating grey and black stems. Only six layers are shown in each 'stream' for illustrative purposes but can comprise of thousands of layers. If all the black material were removed, the result would be a grey core with four stems each with six branches of material. This greatly increases the surface area exposed to the environment.

Figure 9B:
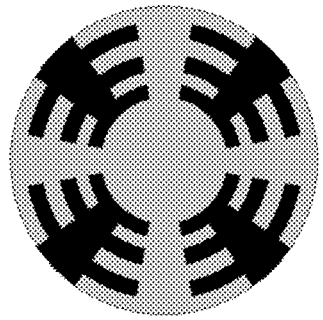

In the embodiment of FIG. 9(b), the stems are tapered radially inwards. The stems can also be made to be tapered radially outwards. The stems and branches can all be made to have different thicknesses and there may be any number of each.

Figure 9C:
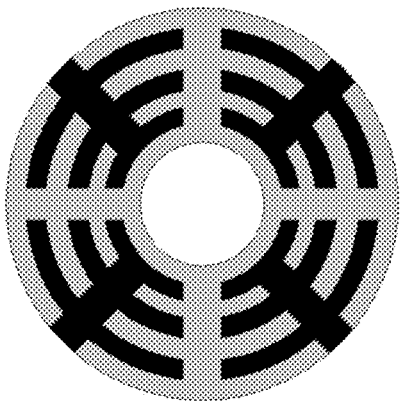

In the embodiment of FIG. 9(c), the core is comprised of a tube made of the grey material. Examples of a core include a solid rod, a hollow tube, a wire, or a profile all of which can either be coextruded or extruded onto and can be comprised of any materials with or without layers. The core can also be absent.

Figure 9D:
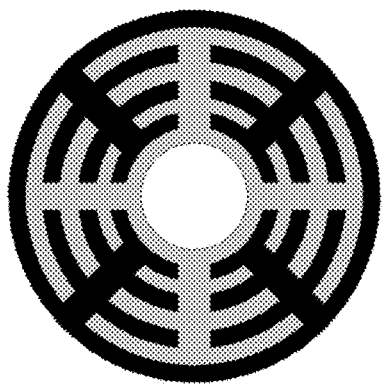

In the embodiment of FIG. 9(d), a layer of black material is coextruded on the outside of the product. This outer layer can be composed of multiple layers and can be comprised of any suitable material or materials.

Figure 9E:
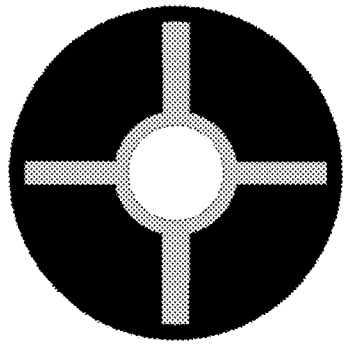

A product could also be configured as seen in FIG. 9(e) where there is a single layer of material between the stems or multiple layers of the same material.

Figure 9F:
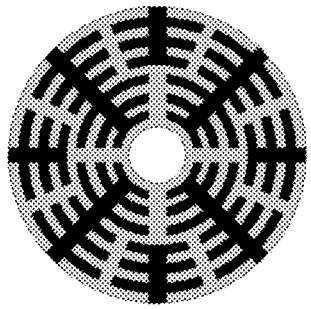

Multiple layers of streams and stems can also be used to be used to be able to create geometries like the one illustrated in FIG. 9(f). Theses layers can contain different numbers of layers, streams and stems in different orientations.

Figure 9G:
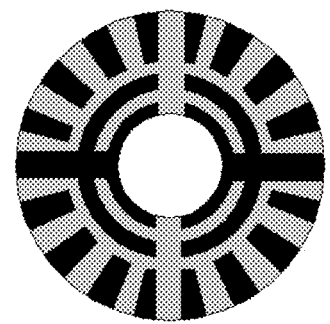

The branch and stem approach may also be applied to streams of rotated or vertical layers to create many stems such as depicted in FIG. 9(g)

The geometries illustrated in FIGS. 9(a-g) are useful in applications where the surface area contact between two materials is important such as an optical fiber coated with a photovoltaic material (such as a dyed zinc-oxide for photon capture) rather than its cladding to create a solar fiber. Another application could be time varying drug delivery.

Figure 10:
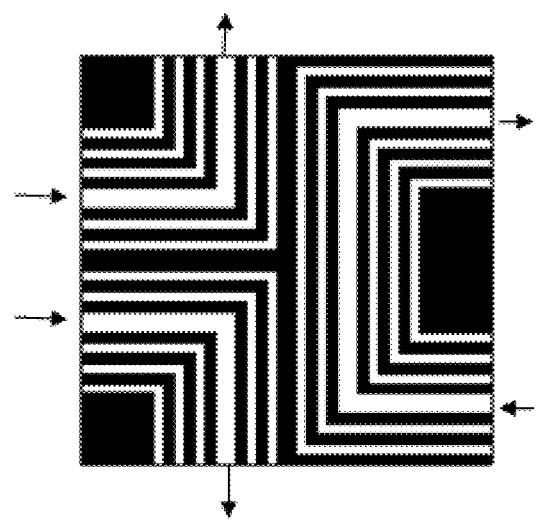
FIG. 10 illustrate a rod that can be extruded.

Beyond designing a waveguide in the direction of extrusion, pathways could also be designed to travel across the extruded cross-section. FIG. 10 depicts a rod which could be extruded. This cross section can be made by merging multiple streams together prior to extrusions. Each one of these streams could be made in their own way; such as through creating layers and bending them, or through merging multiple other streams. Such a cross section would provide a waveguide pathway for light to travel and turn or form some juncture. There could be any number of inlets and outlets for the light to travel.

Figure 11:
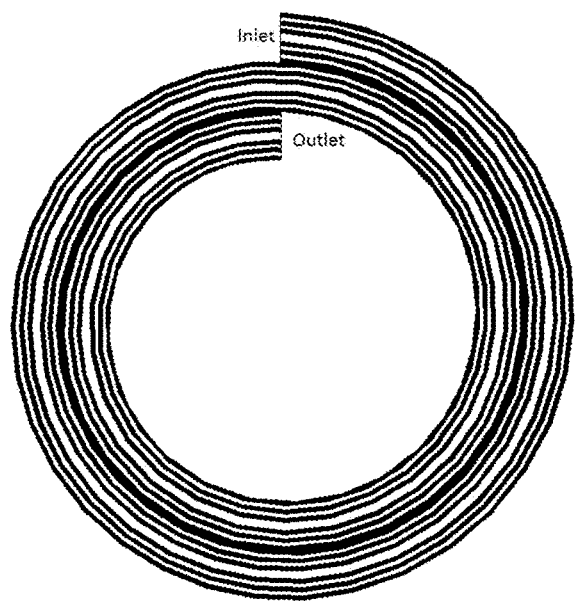
FIG. 11 illustrates a stream of layers made to form a tube.

A stream of layers could also be made to form a tube through a wrapping process which could occur internally prior to extrusion or externally after extrusion (see FIG. 11). This geometry which could wrap around any number of times, would bring light either from inside of the geometry to the outside of the geometry or the reverse.

Another approach to transmit light to or from the center of the cross-section is depicted in FIG. 12.

FIG. 13(a) represents an example of a stream of material that could be formed by layering a stream containing alternating layers of black and white material with a stream of the black material. Three streams analogous to the method described above may be combined onto a small core containing the black material and then combined with an outside coating to form the cross section 13(b). This example cross section could be used to create photonic crystal wave guides. These waveguides use holes in a cladding material to guide a wave along a path. Photonic crystal wave guides have numerous uses including photonic crystal fibers and lasers. The white material in the figures above could be dissolved to create holes or contain a material with different refractive indices from the black material.

All these geometries, methods and products may also be used in conjunction with 3D printing methods in which the extrusion head is coupled to the 3D printing mechanism so as to extrude the geometries described above. Examples could include 3D printed optical fibers, waveguides or Annular Bragg Resonators.

All figures contain a limited number of layers for illustration purposes but could range from under 10 to thousands of layers.

The invention claimed is:

1. A tubular device comprising co-extruded micro- to nano- polymer annular layers in a seamless tubular shape wherein the annular layers include at least one photovoltaic material and at least one layer allows for the passage of light.

2. The tubular device according to claim 1, wherein the device comprises multiple streams of layered material or non-layered-material.

3. The tubular device according to claim 1, wherein the device comprises multiple streams that are merged, folded, bent or wrapped.

4. The tubular device according to claim 2, wherein the device comprises multiple streams forming radial stems.

5. The tubular device according to claim 4, wherein said stems are tapered radially inwards.

6. The tubular device according to claim 4, wherein said stems are tapered radially outwards.

7. The tubular device according to claim 4, wherein the stems have constant thicknesses.

8. The tubular device according to claim 4, wherein the stems have different thicknesses.

9. The tubular device according to claim 1, wherein said device is a photonic crystal fiber.

10. The tubular device according to claim 1, wherein said device bends light.

11. The tubular device according to claim 1, wherein said device transmits light through a tube.

12. The tubular device according to claim 1, wherein at least one layer contains a conducting material.

13. The tubular device according to claim 1, which contains a core or substrate.

14. The tubular device according to claim 1 wherein the core is hollow.

* * * * *